Sept. 26, 1944.  W. C. SPEAR ET AL  2,359,169
SHAFT SEAL
Filed July 14, 1942
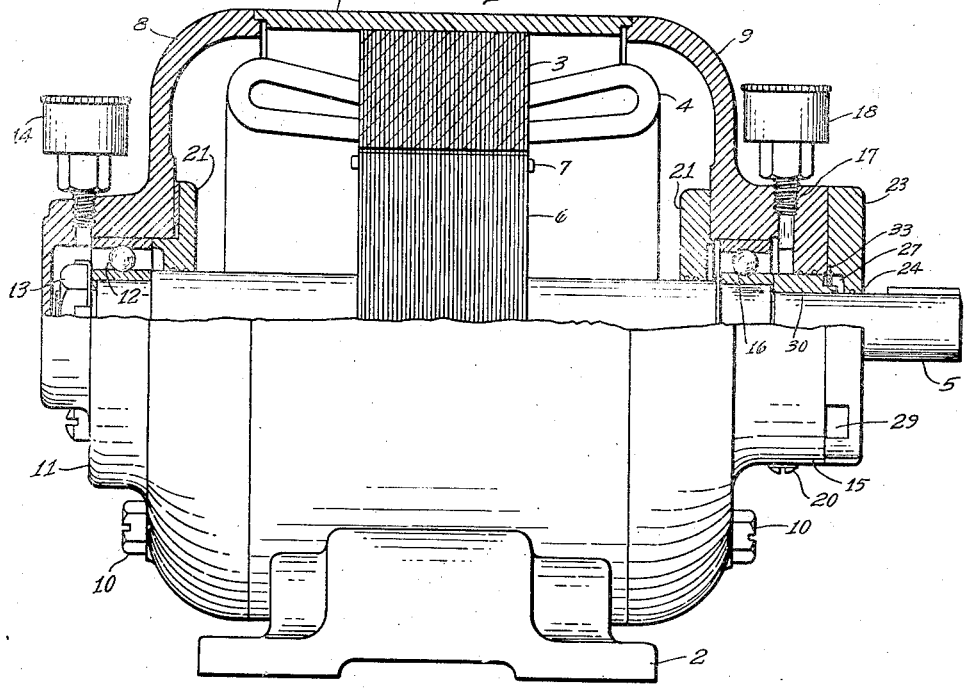
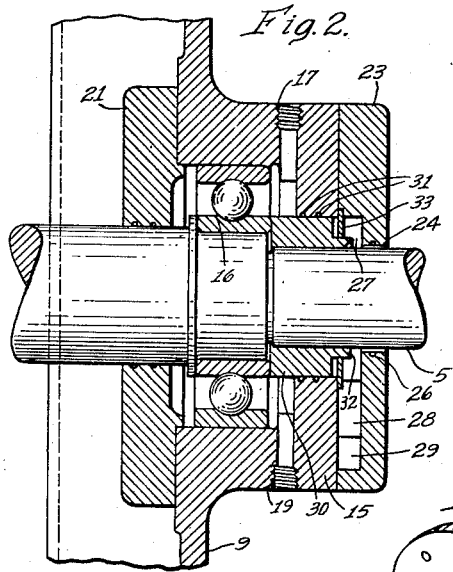
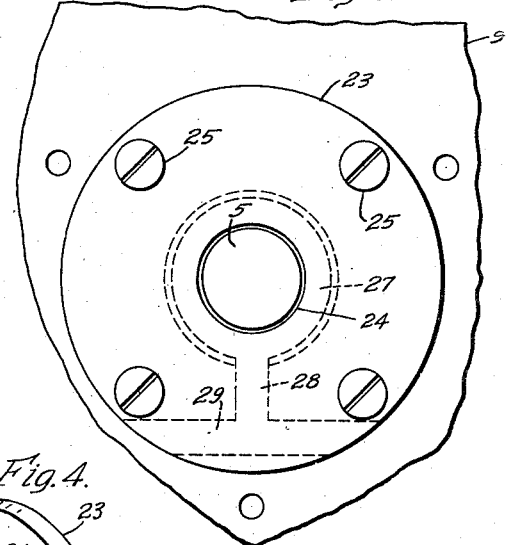
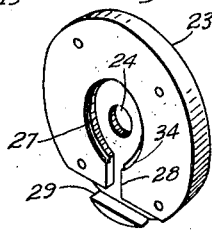
WITNESSES:
C. J. Weller.
F. P. Lyle
INVENTORS
Wendell C. Spear and
Raymond W. Esarey.
BY
O. B. Buchanan
ATTORNEY Patented Sept. 26, 1944

2,359,169

UNITED STATES PATENT OFFICE 2,359,169

SHAFT SEAL

Wendell C. Spear, Wapakoneta, and Raymond W. Esarey, Lima, Ohio, assignors to Westinghouse Electric & Manufacturing Company, East Pittsburgh, Pa., a corporation of Pennsylvania Application July 14, 1942, Serial No. 450,852

6 Claims. (Cl. 286—5)

The present invention relates to shaft seals for enclosed machines for the purpose of preventing the entrance of water, or other liquids, along an extending shaft.

The invention is suitable for use in any type of enclosed machine which has a rotatable shaft extending through the enclosing casing, but it is especially adapted for use in water-proof dynamo-electric machines. Electric motors which are to be used in locations where they may be subjected to streams of water directed against the motor with great force, as in exposed locations on shipboard, for example, must be designed to be completely water-proof, and they must be able to withstand streams of water of considerable force without permitting any appreciable amount of moisture to penetrate to the interior of the motor. The frames or housings of totally enclosed motors can readily be made substantially water-proof by suitably sealing the joints, but the point or points where the extending shaft of the motor passes through the end brackets is very difficult to make water-tight, and the major problem in the design of water-proof motors has been to prevent the entrance of water through the end brackets along the shaft. The present invention provides a very effective shaft seal construction for this purpose, although its usefulness is not limited to this particular application and it may be utilized in any enclosed machine.

The principal object of the invention, therefore, is to provide a shaft seal for enclosed machines having a rotatable shaft extending through the enclosing casing, which is capable of withstanding streams of water, or other liquid, of relatively great force.

Another object of the invention is to provide a shaft seal for dynamo-electric machines which is of simple and inexpensive construction, and which does not materially increase the overall length of the machine, or require any substantial modification of standard motor bracket designs, and which is strong and rugged so that it is capable of withstanding mechanical shocks without damage.

A more specific object of the invention is to provide a shaft seal for enclosed machines in which liquid is permitted to penetrate into the seal and is then trapped in the seal and drained off, and in which the drainage means is so arranged that it is impossible for the pressure of the liquid trapped in the seal to be built up high enough to force the liquid into the interior of the machine, even if a stream of liquid is played directly into a drainage opening.

The invention will be more clearly understood from the following detailed description, taken in connection with the accompanying drawing, in which:

Figure 1 is a side view, partly in section, of an electric motor embodying the invention;

Fig. 2 is a longitudinal sectional view, on a larger scale, showing the shaft seal construction;

Fig. 3 is an end view of the structure shown in Fig. 2; and

Fig. 4 is a perspective view of an element of the seal.

The invention is shown in the drawing applied to a water-proof electric motor having a frame or housing 1 supported on feet 2. The motor has a laminated stator core 3, which is rigidly supported in the frame 1, and which has suitable stator windings 4 placed in slots in its inner periphery in the usual manner. The motor also has a shaft 5 on which is secured a laminated rotor member 6 which carries a rotor winding 7. The shaft 5 is supported in end brackets 8 and 9, which are secured to the frame 1 in any suitable manner, as by through bolts 10, and which form with the frame 1 an enclosing housing or casing for the motor, the joints being made water-tight in any suitable manner.

The end bracket 8 at one end of the frame 1 has a bearing housing or boss 11 formed on it, the outer end being completely closed. The outer race of a ball bearing 12 is mounted in the bearing housing 11 and the inner race is clamped on the shaft 5 in any suitable manner, such as by a nut 13 threaded on the end of the shaft. A grease cup 14 may be provided on the bearing housing 11 to facilitate lubrication of the bearing.

The end bracket 9 at the other end of the motor cannot be completely closed in the same manner as the bracket 8 since it is necessary for the shaft 5 to extend through the end bracket. The end bracket 9 has a bearing housing 15, which is preferably of the same shape as the bearing housing 11, but open at its outer end, and which is preferably formed integrally with the end bracket. A ball bearing 16 has its outer race mounted in the bearing housing 15 and its inner race secured to the shaft 5 by a press fit, or in any other suitable manner. The bearing housing 15 may have a threaded hole 17 for the reception of a grease cup 18, and a similar threaded hold 19 at the bottom, for drainage of lubricant, which is normally closed by a plug 20. Internal bearing caps 21 may be provided at both ends of the motor to keep grease or other lubricant out of the interior of the motor.

The shaft seal of the present invention, which prevents the entrance of water, or other liquid, along the shaft 5 where it passes through the end bracket 9 and bearing housing 15, includes an outer cap member 23. The cap 23 has a central opening 24 which surrounds the shaft 5 with a very small clearance, and it is secured to the outer face of the bearing housing 15 in any suitable manner, as by screws 25. A labyrinth groove 26 may be provided in the cylindrical surface of the opening 24 to assist in preventing the entrance of too much water through the clearance space. The cap 23 has an annular recess or opening 27 in its internal surface, which surrounds the shaft and provides an open space around it. A vertical groove 28 is cut in the inside surface of the cap 23 extending downward from the recess 27, and a horizontal groove 29 is cut in the lower part of the cap 23, intersecting the vertical groove 28.

A sleeve member 30 is rigidly secured to the shaft 5 by a press fit, or in any other suitable manner, and the sleeve member preferably has a very small clearance with the opening in the bearing housing 15, which has labyrinth grooves 31 in it. The outer end of the sleeve 30 is of reduced diameter, and it terminates within the recess 27 of the cap 23. The end of the sleeve 30 preferably has an internal conical surface 32 formed on it facing towards the exterior of the motor. A thin annular metal washer 33 is supported in a shallow recess 34 in the cap member 23, and is clamped between the cap and the outer face of the bearing housing 15. The washer 33 is held stationary and encircles the reduced end of the sleeve 30 with a very small clearance.

In operation, if a stream of water is directed against the end of the motor while it is running, the small clearance between the cap 23 and the shaft 5 will prevent the greater part of the water reaching the motor from entering along the shaft. A small amount of the water, however, will penetrate through this clearance, although some of it will be prevented from reaching the interior of the seal by the labyrinth groove 26, which may be filled with grease to increase its effectiveness. Some portion of the water, however, will reach the interior of the cap along the shaft 5, although its velocity will be greatly reduced after passing through the small clearance. This water flowing along the shaft will strike the end of the sleeve 30, which rotates with the shaft, and will be thrown off by the centrifugal effect of the sleeve. The internal conical surface 32 has the effect of throwing this water back towards the outside rather than radially away from the shaft. The water thus thrown off the shaft strikes the walls of the recess 27, but it is prevented from entering the interior of the motor by the stationary washer 33, which has a very small clearance with the sleeve 30. Thus, this water is trapped in the recess 27, and flows down to the bottom of the recess and drains out through the vertical groove 28 and the horizontal groove 29, which is open at both ends so that the water can drain out through the groove in both directions. Any small amounts of moisture which may get through the clearance between the washer 33 and the sleeve 30 are caught by the labyrinth grooves 31, which may also be filled with grease, and thus it is impossible for any substantial amount of moisture to get into the interior of the motor through the new shaft seal.

It will be apparent that a very effective shaft seal of relatively simple and inexpensive construction has been provided. This seal is capable of withstanding heavy streams of water at standstill, as well as when the shaft is rotating, since even when the shaft is stationary, the small amount of water which may get through the clearance between the cap 23 and the shaft is deflected by the end of the sleeve 30 and trapped in the recess 27, so that it drains out through the grooves 28 and 29 without penetrating into the interior of the motor. This shaft seal is capable of withstanding very strong streams of water. Thus, tests have shown that even when subjected to a stream of water from a one-inch hose under pressure equivalent to a 35-foot head and played on the motor from all directions, substantially no moisture could be detected in the interior of the motor.

The new seal has numerous advantages. Thus, it is of simple and inexpensive construction and does not materially increase the overall length of the motor. There are no external rotating parts, and the seal is equally effective whether the motor is rotating or standing still. It should also be observed that the construction is such that it can be applied to standard motor brackets without requiring any substantial modification in design, which is an important practical advantage. The construction of the seal is very strong and rugged, and it is capable of withstanding severe mechanical shocks without damage.

The effectiveness of the seal appears to be due to the principle of permitting part of the water to penetrate into the interior of the seal, and then trapping it and draining it off without permitting it to get into the motor itself. The particular arrangement of the drainage grooves 28 and 29 is also an important feature of the invention. If only a single drainage opening were provided, it would be possible, if a stream of water were directed against the drainage opening, for the space in which the water is trapped within the seal to become filled with water, and for sufficient pressure to be built up to force this water into the interior of the motor. With the arrangement of drainage grooves described above, however, such an effect is impossible, since the horizontal groove 29 is open at both ends, providing two drainage outlets. Thus, even if a stream of water were directed at one of these outlets, the water flowing in would pass straight across through the groove 29 and out on the other side, so that no pressure could be built up inside the seal and no water could be forced into the motor.

It should now be apparent that a very effective shaft seal has been provided for enclosed machines to prevent the entrance of liquid along an extending shaft. A preferred embodiment of the invention has been illustrated and described, but it is to be understood that the invention is capable of various modifications, and in its broadest aspects it includes all equivalent modifications and embodiments which come within the scope of the appended claims.

We claim as our invention:

1. In an enclosed machine having a casing and a rotatable shaft extending therethrough, sealing means for preventing the entrance of liquid into the casing, said sealing means comprising a cap member having an inner surface engaging the casing, said cap member surrounding the shaft with a small clearance and having an internal recess surrounding the shaft, and means for trapping liquid flowing along the shaft in said recess, said cap member having radial and transverse grooves in its inner surface, said radial groove communicating with said recess and with said transverse groove, the transverse groove being spaced from the recess and providing at least two outlets for the escape of liquid.

2. In an enclosed machine having a casing and a rotatable shaft extending therethrough, sealing means for preventing the entrance of liquid into the casing, said sealing means comprising a cap member having an inner surface engaging the casing, said cap member surrounding the shaft with a small clearance and having an internal recess surrounding the shaft, and means for trapping liquid flowing along the shaft in said recess, said cap member having radial and transverse grooves in its inner surface, said radial groove being disposed to drain liquid from said recess to said transverse groove, the transverse groove being spaced from the recess and providing two horizontally aligned outlets.

3. In an enclosed machine having a casing and a rotatable shaft extending therethrough, sealing means for preventing the entrance of liquid into the casing, said sealing means comprising a cap member on the casing, said cap member surrounding the shaft with a small clearance and having an internal recess surrounding the shaft, and means for trapping liquid flowing along the shaft in said recess, said cap member having a vertical groove in its inner surface communicating with said recess, and said cap member also having a horizontal groove communicating with said vertical groove, said horizontal groove extending entirely across the cap member to provide outlets at its ends for liquid draining from the recess through the grooves.

4. In an enclosed machine having a casing and a rotatable shaft extending therethrough, sealing means for preventing the entrance of liquid into the casing, said sealing means comprising a cap member on the casing, said cap member surrounding the shaft with a small clearance and having an internal recess surrounding the shaft, means on the shaft adjacent said recess for throwing off liquid flowing along the shaft, and means for preventing said liquid from entering the interior of the casing, said cap member having radial and transverse grooves in its inner surface, said radial groove communicating with said recess and with said transverse groove, the transverse groove being spaced from the recess and providing at least two outlets for the escape of liquid.

5. In an enclosed machine having a casing and a rotatable shaft extending therethrough, sealing means for preventing the entrance of liquid into the casing, said sealing means comprising a cap member on the casing, said cap member surrounding the shaft with a small clearance and having an internal recess surrounding the shaft, means on the shaft adjacent said recess for throwing off liquid flowing along the shaft, and a stationary annular member closely surrounding said last-mentioned means to prevent liquid thrown off the shaft from entering the interior of the casing, said cap member having radial and transverse grooves in its inner surface, said radial groove being disposed to drain liquid from said recess to said transverse groove, the transverse groove being spaced from the recess and providing two horizontally aligned outlets.

6. In an enclosed machine having a casing and a rotatable shaft extending therethrough, sealing means for preventing the entrance of liquid into the casing, said sealing means comprising a cap member on the casing, said cap member surrounding the shaft with a small clearance and having an internal recess surrounding the shaft, a sleeve member on the shaft, said sleeve member terminating within said recess and having an end portion adapted to throw off liquid flowing along the shaft, and a stationary annular member closely surrounding said sleeve member to prevent liquid thrown off the shaft from entering the interior of the casing, said cap member having a vertical groove in its inner surface communicating with said recess, and said cap member also having a horizontal groove communicating with said vertical groove, said horizontal groove extending entirely across the cap member to provide outlets at its ends for liquid draining from the recess through the grooves.

WENDELL C. SPEAR.
RAYMOND W. ESAREY.